(12) United States Patent  
Amsley et al.

(10) Patent No.: US 9,132,770 B2
(45) Date of Patent: Sep. 15, 2015

(54) VEHICLE ILLUMINATION SYSTEM

(71) Applicant: Oshkosh Corporation, Oshkosh, WI (US)

(72) Inventors: Joel E. Amsley, Greencastle, PA (US); Sanjeev T. Kuriakose, Shippensburg, PA (US); Brandon F. Tucker, Harrisonville, PA (US)

(73) Assignee: Oshkosh Corporation, Oshkosh, WI (US)

( * ) Notice: Subject to any disclaimer, the term of this patent is extended or adjusted under 35 U.S.C. 154(b) by 332 days.

(21) Appl. No.: 13/796,340

(22) Filed: Mar. 12, 2013

(65) Prior Publication Data

US 2013/0265789 A1  Oct. 10, 2013

Related U.S. Application Data

(60) Provisional application No. 61/620,850, filed on Apr. 5, 2012.

(51) Int. Cl.

| | |
|---|---|
| *F21V 23/00* | (2015.01) |
| *F16B 2/02* | (2006.01) |
| *F21S 8/10* | (2006.01) |
| *G09F 21/04* | (2006.01) |
| *B60Q 1/30* | (2006.01) |
| *B60Q 1/32* | (2006.01) |

(52) U.S. Cl.
CPC ........ *B60Q 1/307* (2013.01); *B60Q 1/32* (2013.01); *Y10T 29/49826* (2015.01)

(58) Field of Classification Search
CPC ................................. B60Q 1/307; B60Q 1/32
See application file for complete search history.

(56) References Cited

U.S. PATENT DOCUMENTS

| | | | | |
|---|---|---|---|---|
| 7,048,419 | B1 * | 5/2006 | Rodriguez | 362/485 |
| 7,055,996 | B2 * | 6/2006 | Pond et al. | 362/498 |
| 2006/0051176 | A1 * | 3/2006 | Davis | 410/30 |

\* cited by examiner

*Primary Examiner* — Joseph L Williams
(74) *Attorney, Agent, or Firm* — Foley & Lardner LLP

(57) ABSTRACT

A vehicle includes a chassis, a bed assembly, and a light assembly. The chassis includes a frame member that defines a longitudinal direction. The bed assembly includes a deck coupled to the frame member and moveable between a transport position and a loading position. The light assembly includes a housing, a marker light coupled to the housing and positioned to deliver light across the longitudinal direction, and an indicator light coupled to the housing and positioned to deliver light in the longitudinal direction. The light assembly is coupled to the bed assembly to improve lateral and longitudinal visibility of the vehicle when the deck is in the transport position and the loading position.

20 Claims, 12 Drawing Sheets

VEHICLE ILLUMINATION SYSTEM

CROSS-REFERENCE TO RELATED APPLICATIONS

This application claims the benefit of U.S. Provisional Patent Application No. 61/620,850, filed Apr. 5, 2012, which is incorporated herein by reference in its entirety.

BACKGROUND

The present application relates generally to the field of vehicle lighting systems. More specifically, the present application relates to indicator lights that improve the visibility of a carrier truck.

Response vehicles, such as carrier trucks, transport cargo (e.g., disabled vehicles, freight, etc.) and may include a chassis and a cab. The response vehicles operate in various environments (e.g., along a roadway, etc.) and conditions (e.g., dark, foggy, dusty, rainy, high traffic, etc.). Response vehicles may include a bed assembly having a deck that rotates between a transport position and a loading position. Rotating the deck into the loading position facilitates the placement of cargo onto the bed assembly for transport. Controls for the deck assembly are often positioned outside the cab of the response vehicle, and an operator interfaces with the controls to lower the deck position into the loading position. In operation, the response vehicle is positioned in front of the cargo, and the cargo is pulled (e.g., with a winch) or otherwise positioned onto the deck (e.g., driven under its own power) from the rear of the deck assembly.

Warning lights indicate the presence of the response vehicle. Traditional response vehicles include a light bar coupled to a headboard and rear lights positioned below the deck at the rear of the bed assembly. When in the loading position, the deck obscures the rear lights and the light bar may be angled relative to the road surface thereby reducing visibility of the response vehicle. Visibility of the warning lights may be further reduced by the cargo itself (e.g., a vehicle may obscure the rear lights, a tall vehicle may obscure the light bar, etc.). Such reductions in visibility makes it difficult for surrounding individuals (e.g., drivers of passing vehicle) to identify the response vehicle.

SUMMARY

One embodiment of the invention relates to a vehicle that includes a chassis, a bed assembly, and a light assembly. The chassis includes a frame member that defines a longitudinal direction. The bed assembly includes a deck coupled to the frame member and moveable between a transport position and a loading position. The light assembly includes a housing, a marker light coupled to the housing and positioned to deliver light across the longitudinal direction, and an indicator light coupled to the housing and positioned to deliver light in the longitudinal direction. The light assembly is coupled to the bed assembly to improve lateral and longitudinal visibility of the vehicle when the deck is in the transport position and the loading position.

Another embodiment of the invention relates to a vehicle that includes a chassis, a bed assembly, and a light assembly. The chassis includes a frame member that defines a longitudinal direction. The bed assembly includes a deck movably coupled to the frame member, and the deck includes a support surface configured to support cargo. The light assembly includes a housing, an indicator light coupled to the housing and positioned to deliver light in the longitudinal direction. The light assembly is coupled along an edge of the bed assembly such that the indicator light is laterally spaced from an outer edge of the support surface to improve longitudinal visibility of the vehicle.

Another embodiment of the invention relates to a method for enhancing visibility of a vehicle. The method includes providing a chassis that defines a longitudinal direction, coupling a bed assembly to the chassis and positioning an indicator light along a surface of the bed assembly. The method also includes engaging the indicator light with a controller. The indicator light delivers light in the longitudinal direction to improve longitudinal visibility of the vehicle.

The invention is capable of other embodiments and of being carried out in various ways. Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
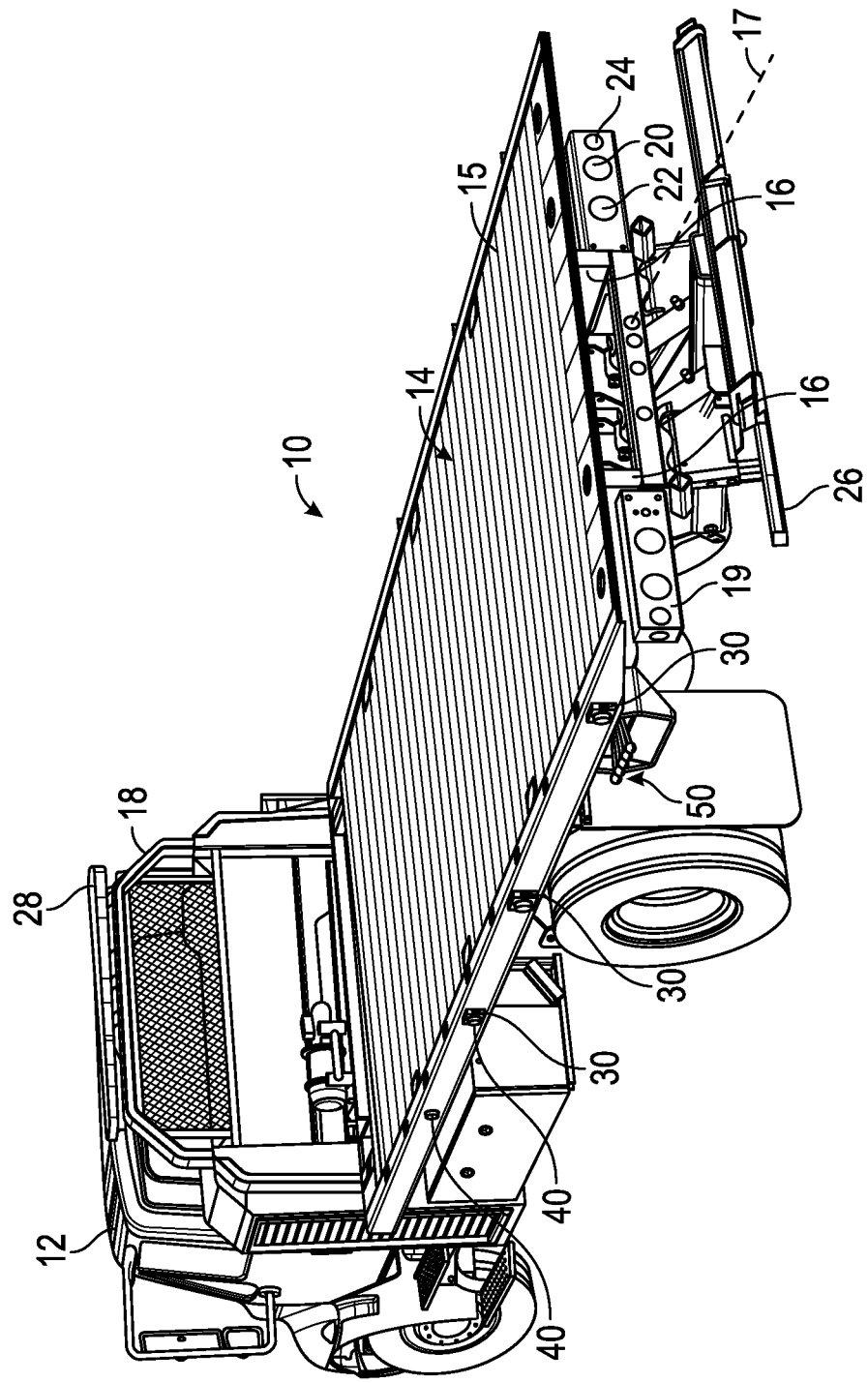
FIG. 1 is an elevation view of a carrier truck having a plurality of indicator lights that deliver light in a rearward direction, according to an exemplary embodiment.
Figure 2:
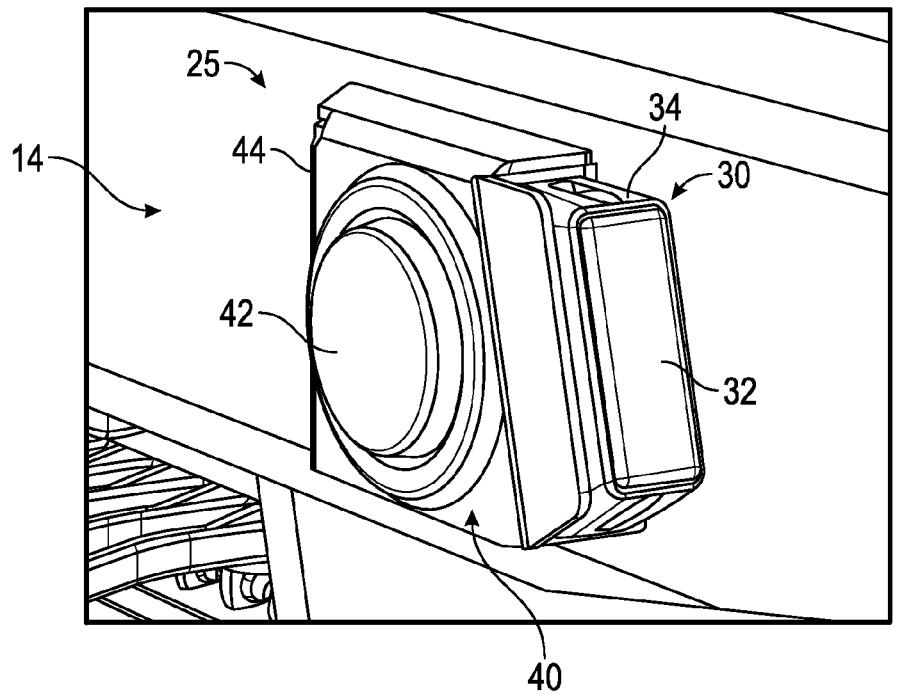
FIG. 2 is a partial elevation view of a light assembly for a vehicle, according to an exemplary embodiment.

According to the exemplary embodiment shown in FIG. 1, a vehicle, shown as carrier truck 10, has improved visibility relative to traditional response vehicles. As shown in FIG. 1, carrier truck 10 is a flatbed tow carrier truck (e.g., rollback truck, rollback carrier, etc.) that includes a cab 12 coupled to a chassis, shown as frame 16. Frame 16 includes a pair of opposing frame members that define a longitudinal direction 17, according to an exemplary embodiment. According to an exemplary embodiment, a forward direction extends in the longitudinal direction 17 toward cab 12 and a rearward direction extends in the longitudinal direction 17 away from cab 12. As shown in FIG. 1, carrier truck 10 includes a bed assembly, shown as carrier 14, that includes a deck (i.e. support surface), shown as platform 15. According to an exemplary embodiment, platform 15 defines a support surface (i.e. a cargo surface) extending between a pair of opposing bed rails. In some embodiments, the support surface is paneled (e.g., includes a plurality of individual panel components coupled together). In other embodiments, the support surface is a solid member. As shown in FIG. 1, a headboard 18 is coupled to the platform 15 of carrier 14. The platform 15 is coupled to frame 16 and moveable between a transport position (i.e. elevated position, horizontal position, etc.) and a loading position (i.e. angled position, tilted position, etc.). According to an exemplary embodiment, actuators (e.g., hydraulic cylinders) move the platform 15 between the transport position and the loading position. As shown in FIG. 1, an operator engages the actuators with controls 50 (e.g., a plurality of levers coupled to hydraulic valves). According to an exemplary embodiment, controls 50 are coupled to frame 16 and positioned at an end of carrier 14. The controls 50 are positioned along a side of carrier truck 10.

According to an exemplary embodiment, carrier truck 10 includes a frame member, shown as bumper 19, coupled to frame 16 and positioned laterally across the longitudinal direction 17. The carrier truck 10 includes a pair of stoplights 20, a pair of back up lights 22, a pair of turn signal lights 24, and a rear reflector 26. As shown in FIG. 1, the carrier truck 10 further includes a warning light bar 28 coupled to the headboard 18. The light bar 28 is intended to project emergency lighting in all directions around the carrier truck 10 (e.g., through a rotating lamp or reflector, through a series of LED lights, etc.). According to an alternative embodiment, warning light bar 28 is coupled to the cab 12 or another support member. As shown in FIG. 1, the pair of stoplights 20, the pair of back up lights 22, the pair of turn signal lights 24, and the rear reflector 26 direct light toward in the rearward direction of carrier truck 10. It should be understood that such lights provide a base level of longitudinal visibility (e.g., visibility from the front, visibility from the rear, etc.) for the carrier truck 10.

As shown in FIG. 1, the carrier truck 10 also includes marker lights, shown as sidelights 40. According to an exemplary embodiment, sidelights 40 are coupled to an edge of carrier 14 along a side face of platform 15. As shown in FIG. 1, carrier truck 10 includes a plurality of sidelights 40 disposed along the length of carrier 14. In one embodiment, the carrier truck 10 includes at least two sidelights 40 on each side of the carrier 14. The sidelights 40 include a light source (e.g., incandescent bulb, LED, halogen bulb, etc.) and a lens disposed over the light source, according to an exemplary embodiment. As shown in FIG. 1, the sidelights 40 are positioned to deliver light across the longitudinal direction 17. According to an exemplary embodiment, the sidelights 40 are configured to mark the presence of the carrier truck 10 and indicate the position and direction of travel of the carrier truck 10 from oblique angles. In some embodiments, the sidelights 40 are not visible from the rear of the carrier truck 10 (e.g., project less than thirty percent of their light energy in the rearward direction). Such sidelights 40 do not contribute to the longitudinal visibility of carrier truck 10.

According to an exemplary embodiment, the platform 15 affects the longitudinal visibility of carrier truck 10 as it moves between the transport position and the loading position. In the transport position, the platform 15 is approximately parallel to a ground surface (e.g., generally horizontal) and engages the frame 16. In the loading position, the platform 15 is angularly offset relative to the frame 16. It should be understood that rotating the platform 15 into the loading position facilitates moving a vehicle, equipment, or other cargo onto the carrier 14. As the platform 15 moves from the transport position to the loading position, and end of the platform 15 travels downward and away from the cab 12. During such a transition, the platform 15 tilts relative to the frame 16 and extends backward until an end of platform 15 engages a ground surface (e.g., a road surface).

Platform 15 obscures the pair of stoplights 20, the pair of back up lights 22, the pair of turn signal lights 24, and the rear reflector 26 when in the loading position. The platform 15 thereby reduces longitudinal visibility of carrier truck 10 when in the loading position. A reduction in longitudinal visibility (e.g., from the rear) of carrier truck 10 may inhibit individuals in the vicinity of the carrier truck 10 (e.g., passing motorists) from identifying and avoiding carrier truck 10 or the operator thereof. According to an exemplary embodiment, carrier truck 10 operates in various environments (e.g., along a roadway, etc.) and conditions (e.g., dark, foggy, dusty, rainy, high traffic, etc.). Such adverse conditions may further reduce the lateral and longitudinal visibility of carrier truck 10. Vehicles, equipment, or other cargo positioned behind the carrier truck 10 (e.g., prior to loading) may obscure the pair of stoplights 20, the pair of back up lights 22, the pair of turn signal lights 24, the rear reflector 26, and the light bar 28 thereby reducing the longitudinal visibility of carrier truck 10 (e.g., from the rear). Vehicles, equipment or other cargo loaded onto platform 15 (e.g., with platform 15 in the transport position) may also obscure light bar 28. It should be understood that taller and wider cargo (e.g., moving vans, etc.) may reduce the longitudinal visibility of carrier truck 10 to a greater degree than narrow and shorter cargo (e.g., a motorcycle). However, even such narrow and shorter cargo may obscure the pair of stoplights 20, the pair of back up lights 22, the pair of turn signal lights 24, the rear reflector 26, and the light bar 28 from view thereby reducing their ability to deliver light in the rearward direction.

The light bar 28 may deliver light that is concentrated in a primary plane and extends between a limited field of view (e.g., between ten and thirty degrees from a horizontal axis). As shown in FIG. 1, the primary plate of the light bar 28 is positioned parallel to frame 16 and a ground surface when platform 15 is in the transport position. According to the exemplary embodiment shown in FIG. 1, light bar 28 is coupled to and moves with the platform 15 (e.g., via headboard 18). As platform 15 moves from the transport position to the loading position, the light bar 28 also moves such that the primary plane is angularly offset relative to a ground surface. Such an angular offset may reduce the quantity of light that light bar 28 projects in the forward direction and the rearward direction thereby reducing the longitudinal visibility of the carrier truck 10 (e.g., from the front, from the rear, etc.).

According to an alternative embodiment, light sources of the light bar 28 may be oriented at different angles to provide greater visibility when the carrier 14 is in the loading position. In another embodiment, the light sources of the light bar 28 or the entire light bar 28 may be coupled to one of the headboard 18, the cab 12 or the support at the front (i.e. the end of carrier 14 at which cab 12 is positioned) of carrier 14 and positioned at an offset angle. The offset angle of the light sources of the light bar 28 or the entire light bar 28 is between zero and forty five degrees. According to an exemplary embodiment, the offset angle of the light sources of the light bar 28 or the entire light bar 28 is between zero and thirty degrees. In one embodiment, the offset angle is fifteen degrees. According to an alternative embodiment, the light bar 28 is movable (e.g., manually, with an actuator, etc.) to level the light bar 28 when the platform 15 is in the loading position.

According to the exemplary embodiment shown in FIG. 1, carrier truck 10 includes an indicator light, show as rear-facing light 30. As shown in FIG. 1, rear-facing light 30 is positioned to deliver right in the longitudinal direction 17 thereby increasing the longitudinal visibility of the carrier truck 10. According to an exemplary embodiment, rear-facing light 30 delivers light in the rearward direction. According to an alternative embodiment, the indicator light may be positioned to deliver light in the forward direction. Improving the longitudinal visibility of the carrier truck 10 provides a greater visual indication to oncoming or rear-approaching individuals or those otherwise in the vicinity of the carrier truck 10.

Referring next to the exemplary embodiment shown in FIGS. 2-6, a light assembly, shown as light assembly 25 includes a sidelight 40 and a rear-facing light 30 coupled to a housing, shown as body 44. The rear-facing lights 30 may be white, amber, red, or another color. The body 44 is manufactured from a corrosion-resistant material (e.g., plastic, a composite, aluminum, etc.) to increase the overall durability of the rear-facing lights 30 and sidelights 40. According to an alternative embodiment, body 44 is manufactured from still another material. According to an exemplary embodiment, light assembly 25 is coupled to carrier 14 to improve the lateral visibility (e.g., due to light from sidelight 40) and the longitudinal visibility (e.g., due to light from rear-facing light 30) of the carrier truck 10 when the platform 15 is in the transport position and the loading position. In one embodiment, each of the sidelights 40 of the carrier truck 10 integrated with a rear-facing light 30 into a body 44. Such an arrangement reduces the complexity of installing rear-facing lights 30 along carrier 14 by allowing existing lights to be removed and replaced with light assembly 25. According to an exemplary embodiment, side marker lights of existing carriers 14 may be replaced without sacrificing lateral visibility. In other exemplary embodiments, the rear-facing lights 30 may not be coupled to or integrated with the sidelights 40 but may instead be separate modules coupled to the carrier 14.

Figure 6:
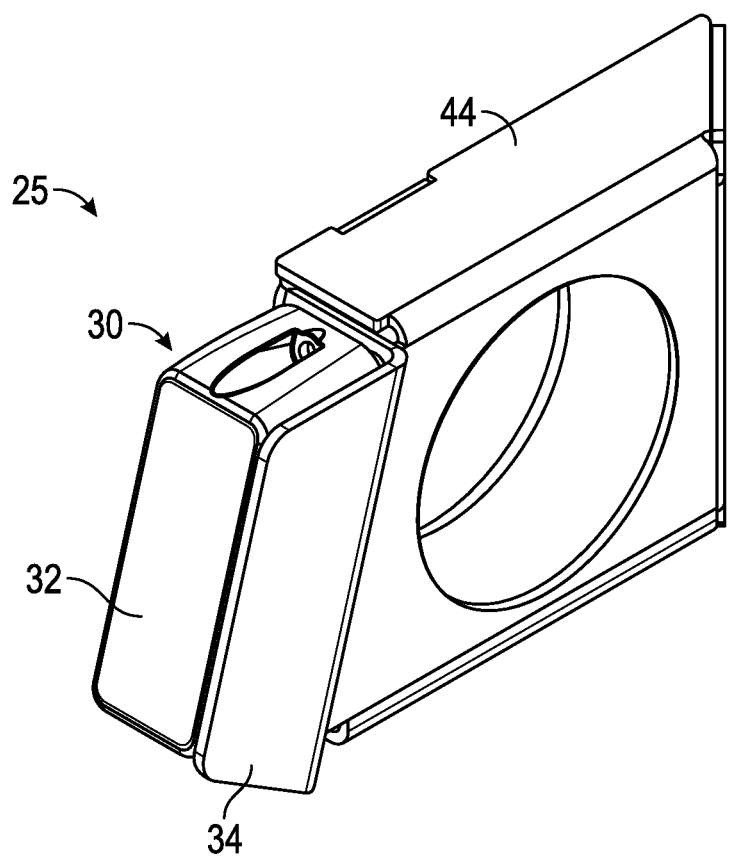
FIG. 6 is an elevation view of a housing and an indicator light of a light assembly for a vehicle, according to an exemplary embodiment.

Referring again to FIGS. 2-6, the sidelights 40 include a lens 42 coupled to body 44. As shown in FIG. 6, body 44 includes a plurality of sidewalls that define an inner volume. According to an exemplary embodiment, body 44 is configured to be coupled to the carrier 14 (e.g., coupled to the surface of the carrier 14, recessed in openings in the carrier 14, etc.). The body 44 may include intermediate apertures, brackets, or other components to facilitate coupling body 44 to a portion of carrier 14. According to an exemplary embodiment, the lens 42 is disposed over a light source of sidelight 40 (e.g., an incandescent bulb, an LED, a halogen bulb, etc.). According to an alternative embodiment, lens 42 includes an integrally formed light source or light producing element (e.g., LED).

According to an exemplary embodiment, the rear-facing lights 30 similarly include a lens 32 coupled to body 44 with an intermediate housing 34. According to an exemplary embodiment, the lens 32 is disposed over a light source of rear-facing lights 30 (e.g., an incandescent bulb, an LED, a halogen bulb, etc.). According to an alternative embodiment, lens 32 includes an integrally formed light source or light producing element (e.g., LED). The intermediate housing 34 of the rear-facing light 30 is coupled to or integrally formed with the body 44.

According to an exemplary embodiment, the rear-facing light 30 directs light along a particular direction and includes a primary light axis, shown as axis 31. The axis 31 is a line along which the intensity of the light from rear-facing light 30 is greatest. According to an exemplary embodiment, the light source of rear-facing light 30 is a directional light source (e.g., an LED) such that axis 31 is related to the orientation of the light source within rear-facing light 30. According to an alternative embodiment, the light source of rear-facing light 30 provides light over a wider area and a wave guide (e.g., lens, housing, tubular member, etc.) is positioned to direct light from the light source of rear-facing light 30 along the axis 31.

Figure 7:
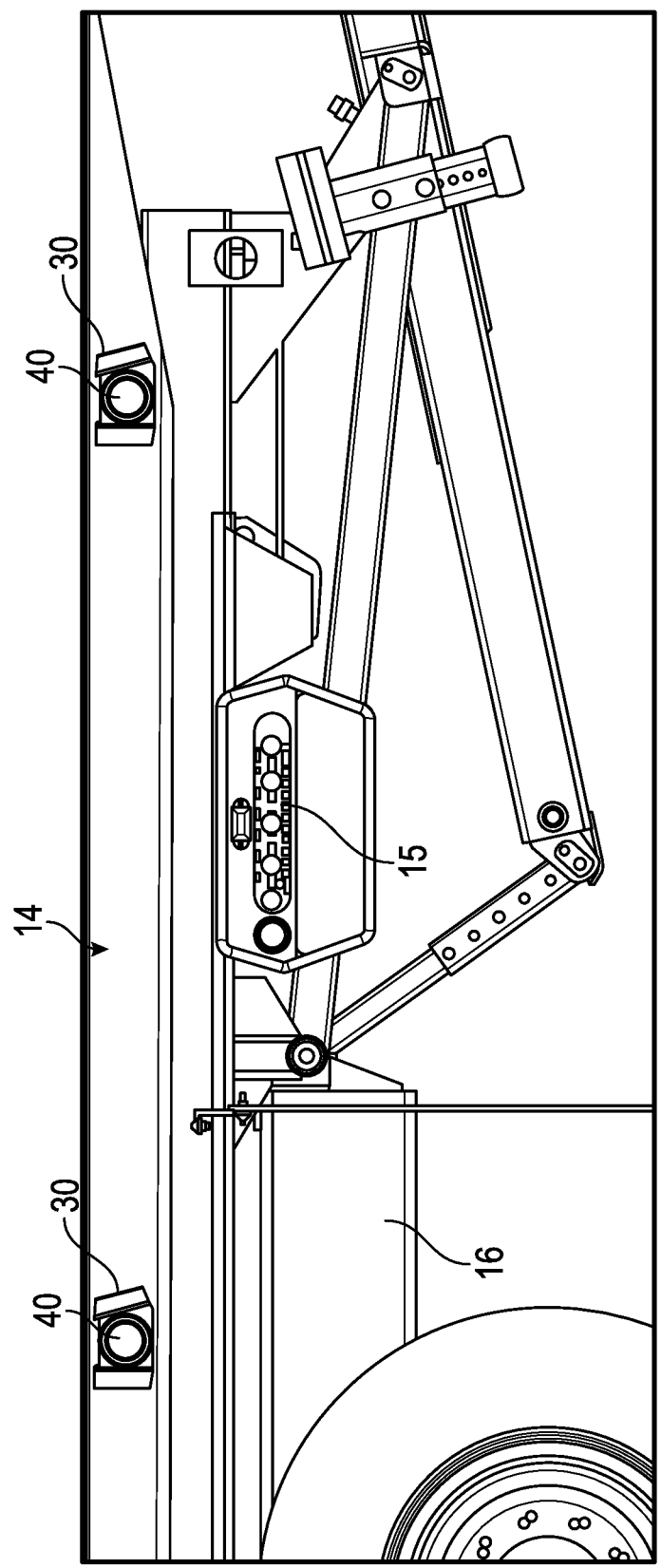
FIG. 7 is a side plan view of a carrier truck having a bed assembly configured in a transport position, according to an exemplary embodiment.
Figure 8:
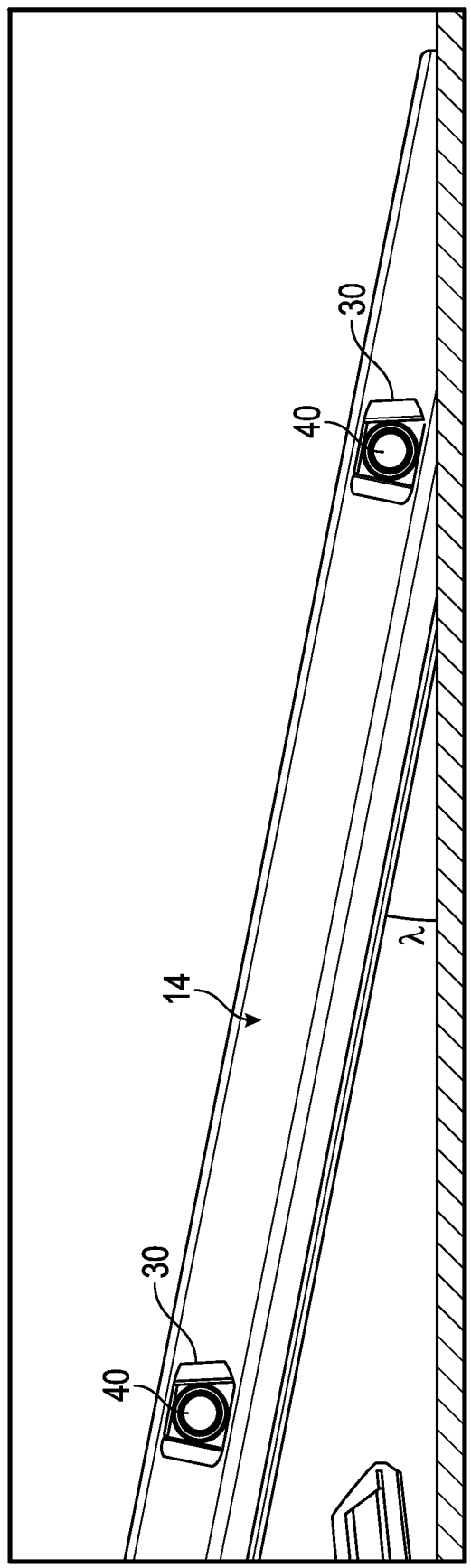
FIG. 8 is a side plan view of a carrier truck having a bed assembly configured in a loading position, according to an exemplary embodiment.

Referring next to FIGS. 7-8, the carrier 14 is moveable between the transport position shown in FIG. 7 and the loading position shown in FIG. 8. As shown in FIG. 8, an angle λ is formed between the carrier 14 and a ground surface when the carrier 14 is in the loading position. The angle λ is between zero and forty five degrees. In some embodiments, the angle λ is between zero and thirty degrees. According to an exemplary embodiment, the angle λ is fifteen degrees.

According to an exemplary embodiment, the axis 31 of rear-facing light 30 is angularly offset relative to the support surface of platform 15 (e.g., from a side view). In some embodiments, the axis 31 is offset at an angle equal to the angle of the deck with respect to the ground when the deck is in the loading position (e.g., angle λ). The angle of the offset determines the primary direction that light travels from rear-facing lights 30. According to an exemplary embodiment, rear-facing lights 30 are positioned to improve longitudinal visibility of the carrier truck 10.

The impact of rear-facing lights 30 on the longitudinal visibility of the carrier truck 10 is greatest when the light therefrom is delivered parallel to the ground surface (e.g., rather than traveling upward into the sky or downward into the ground). According to an exemplary embodiment, the axis 31 is offset from the support surface of the platform 15 such that when the platform 15 is tilted in the loading position, rear-facing lights 30 deliver light parallel to the ground surface. According to an alternative embodiment, the axis 31 is offset from the support surface at angle greater than or smaller than the angle formed between the platform 15 and the ground surface when the platform 15 is in the loading position (e.g., angle λ). Such an offset angle may improve the longitudinal visibility of the carrier truck at a distance from the carrier 14 (e.g., the axis 31 may direct light at eyelevel of a person positioned thirty feet behind carrier 14).

Figure 3:
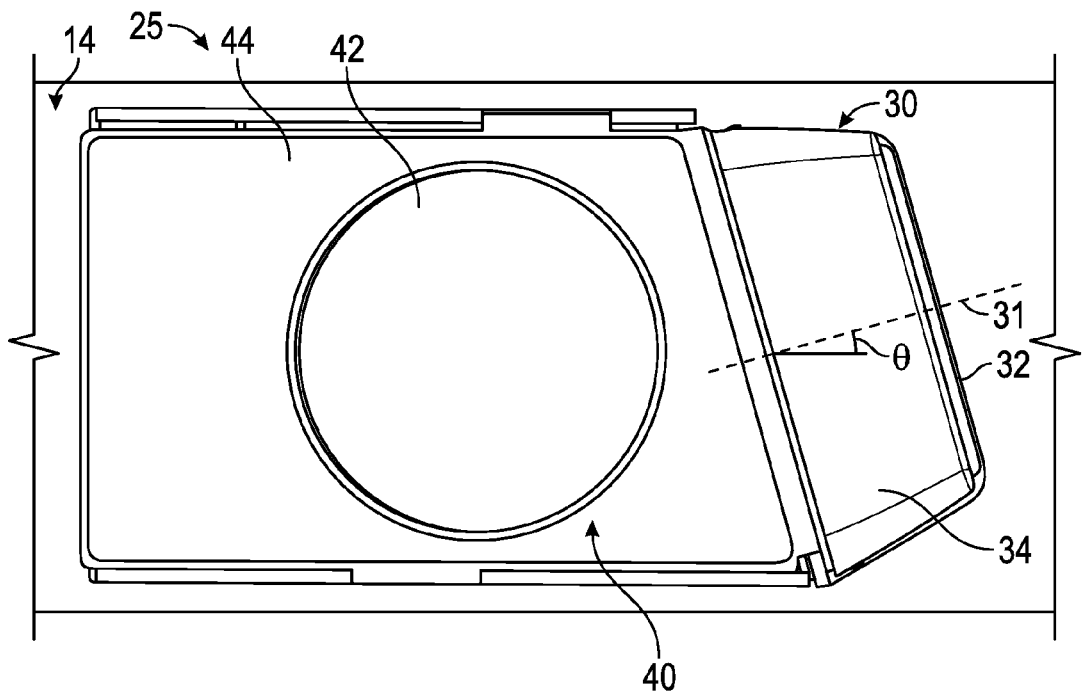
FIG. 3 is a side plan view of a light assembly for a vehicle, according to an exemplary embodiment.
Figure 4:
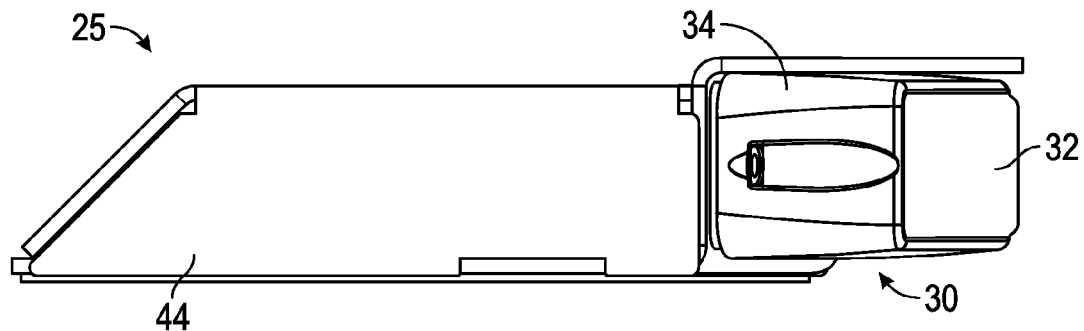
FIG. 4 is a top plan view of a light assembly for a vehicle, according to an exemplary embodiment.
Figure 5:
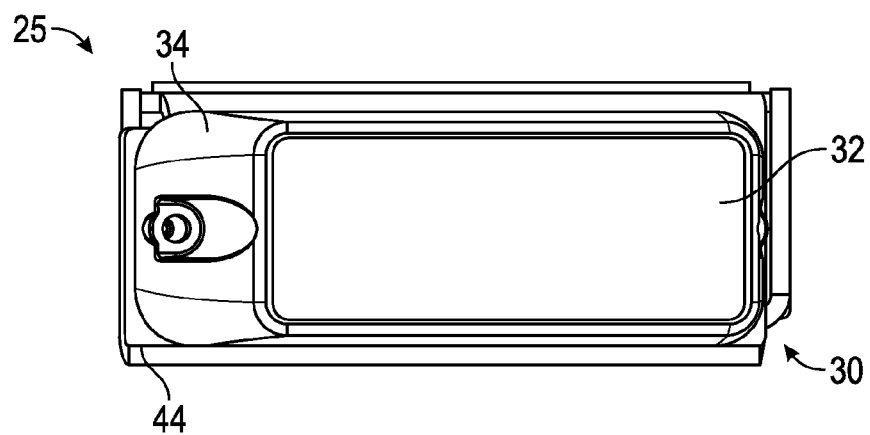
FIG. 5 is a side plan view of a light assembly for a vehicle, according to an exemplary embodiment.

Referring to FIGS. 3 and 7-8, the body 44 of light assembly 25 is positioned parallel to the support surface of the platform 15. As shown in FIG. 3, the axis 31 of rear-facing light 30 is offset at an angle θ relative to a line parallel to the support surface of platform 15. The support surface of the platform 15 may be parallel to the ground surface when the platform 15 is in the transport position, according to an exemplary embodiment. According to an alternative embodiment, the body 44 is rotated an angle θ about an axis extending orthogonal to a side surface of carrier 14 such that axis 31 extends parallel to a ground surface when platform 15 is in the loading position. The angle θ is between zero and forty five degrees. In some embodiments, angle θ is between zero and thirty degrees. According to an exemplary embodiment, angle θ is fifteen degrees. According to an exemplary embodiment, the rear-facing lights 30 are generally horizontal (e.g., lenses 32 are approximately perpendicular to the ground) when the carrier 14 is in the loading position. The rear-facing lights 30 thereby emit light in the rearward direction and improve longitudinal visibility of the carrier truck 10 when the platform 15 is in the transport position and the loading position.

Figure 9:
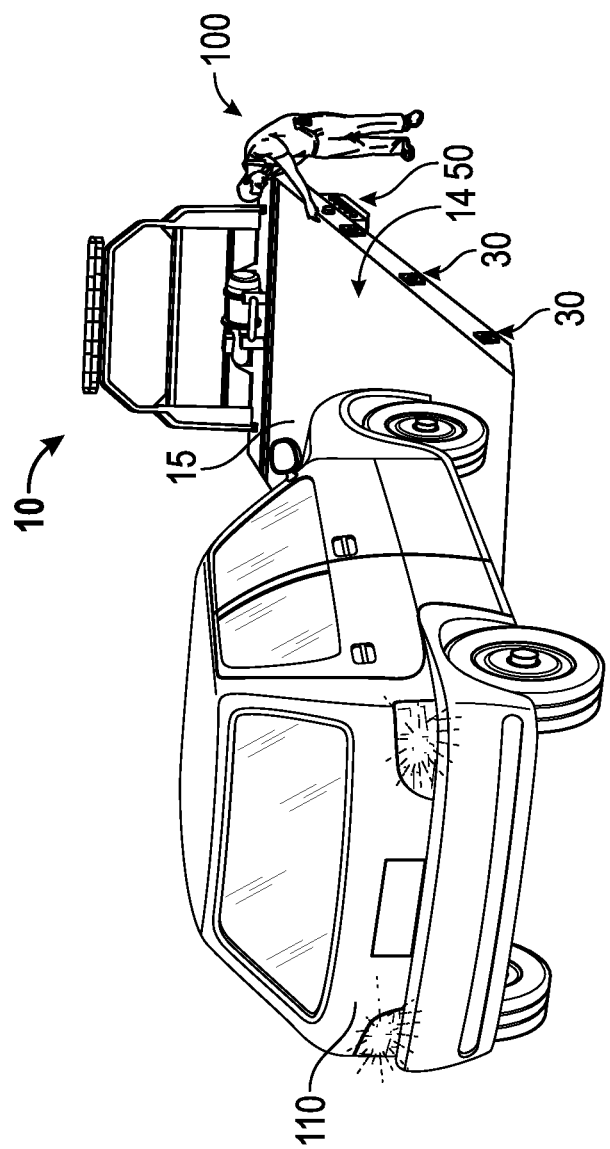
FIG. 9 is an elevation view of a carrier truck having a bed assembly configured in a transport position, according to an exemplary embodiment.

According to the exemplary embodiment shown in FIG. 9, controls 50 are positioned to reduce the likelihood that an operator will be exposed to light directed by rear-facing lights 30. As shown in FIG. 9, an operator 100 interfaces with controls 50 to move the platform 15 between the transport position and the loading position. A vehicle 110 is positioned behind carrier truck 10 before it is positioned on carrier 14. As shown in FIG. 9, the rear-facing lights 30 direct light in the rearward direction without directing light toward operator 100 operating controls 50. Such a position of controls 50 and rear-facing lights 30 reduces the risk that operator 100 will be distracted by light from rear-facing lights 30 while improving the longitudinal visibility of carrier truck 10.

Figure 10:
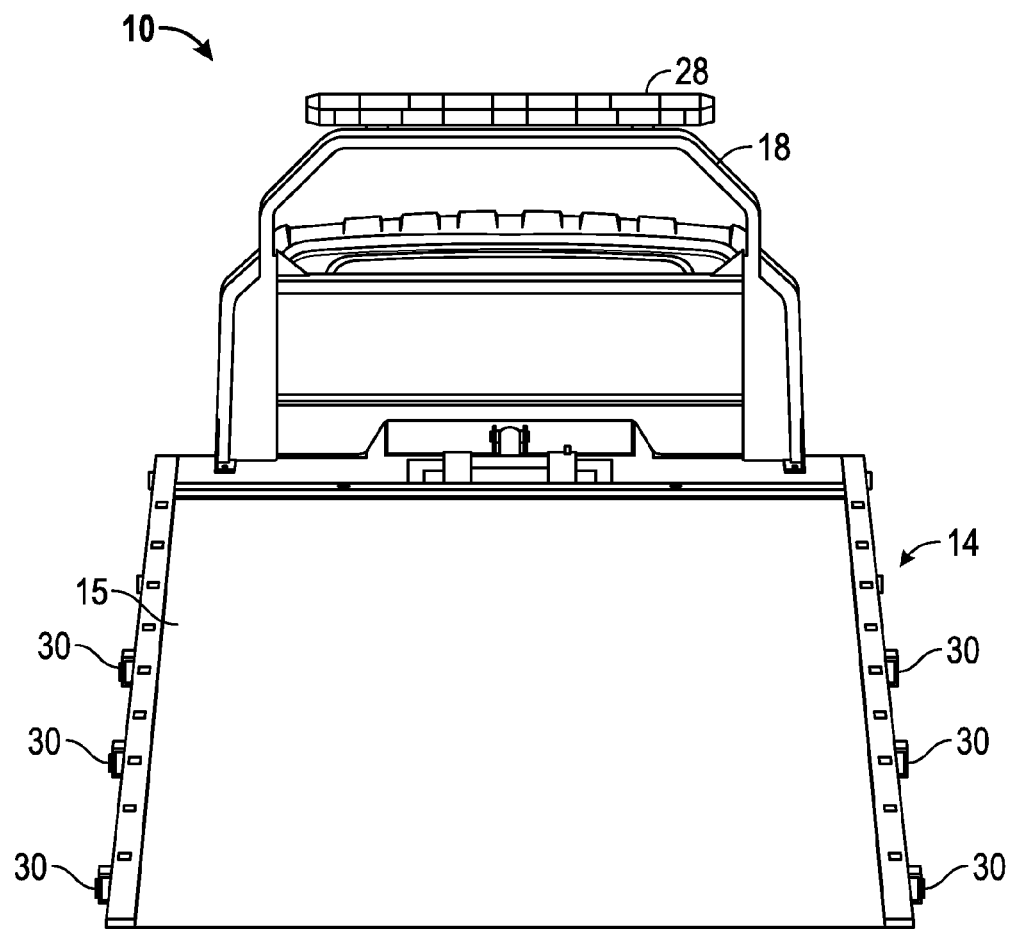
FIG. 10 is a rear plan view of a carrier truck having a bed assembly configured in a loading position, according to an exemplary embodiment.

According to the exemplary embodiment shown in FIG. 10, the platform 15 of the carrier 14 is configured in the loading position. FIG. 10 shows a view along the forward direction from the rear of carrier truck 10, according to an exemplary embodiment. As shown in FIG. 10, the platform 15 obscures the pair of stoplights, the pair of back up lights, the pair of turn signal lights, and the rear reflector thereby reducing the longitudinal visibility of carrier truck 10. According to an exemplary embodiment, the rear-facing lights 30 are coupled to carrier 14. Coupling the rear-facing lights 30 to carrier 14 prevents platform 15 from obscuring rear-facing lights 30 when in the loading position. As shown in FIG. 10, the rear-facing lights 30 are positioned along an edge of carrier 14. In such a position, the rear-facing lights 30 are laterally spaced from an outer lateral edge of the support surface of platform 15. According to an exemplary embodiment, the lateral spacing between the outer lateral edge of the support surface and rear-facing lights 30 reduces the likelihood that vehicles, equipment, or other cargo will obscure the light delivered in the rearward direction by rear-facing lights 30 thereby improving the longitudinal visibility of the vehicle. Because the rear-facing lights 30 are arranged along the side of the carrier 14, a number of the rear-facing lights 30 are likely to be visible from the rear of the carrier truck 10, regardless of the width of the vehicle, cargo, or equipment being carried or loaded onto the carrier 14.

Figure 11:
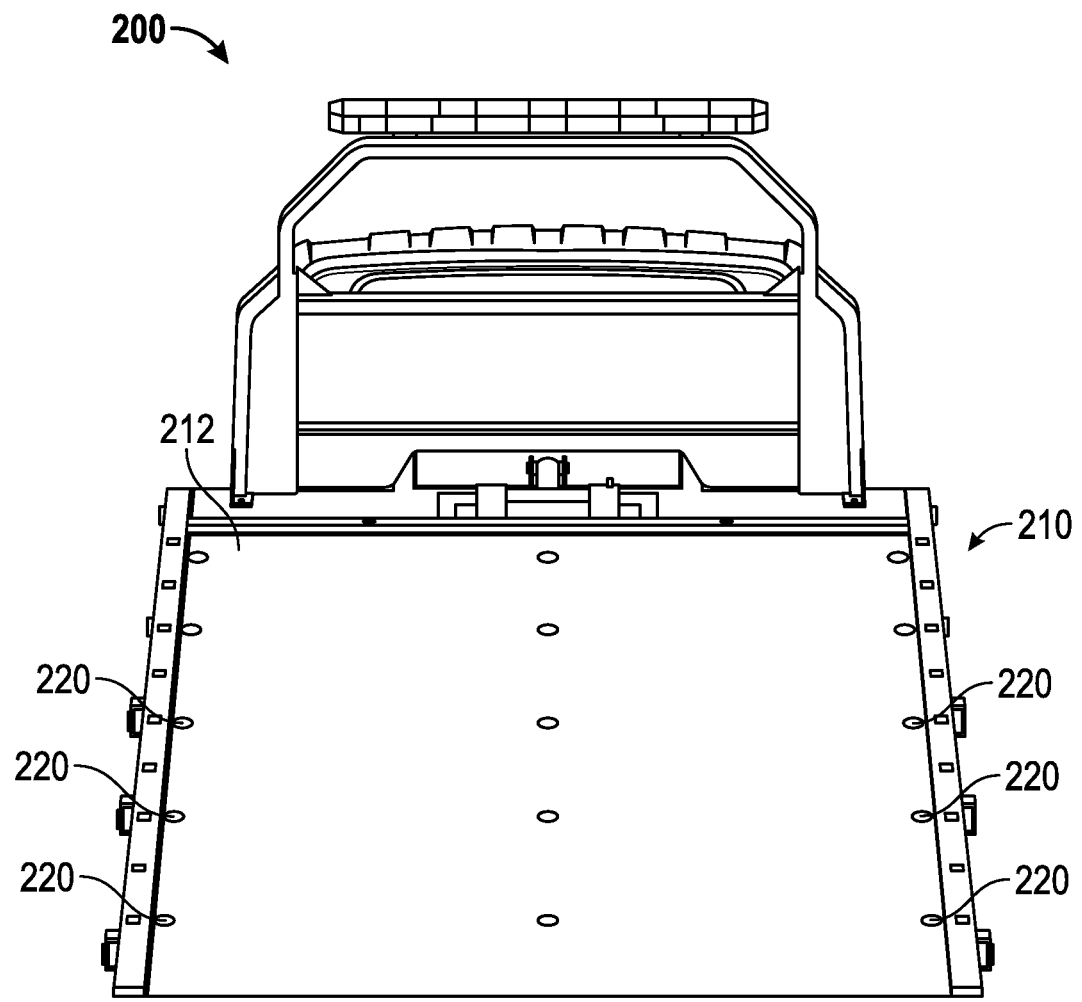
FIGS. 11-12 are rear plan views of a carrier truck having a plurality of indicator lights coupled to a bed assembly that is configured in a loading position, according to an exemplary embodiment.
Figure 12:
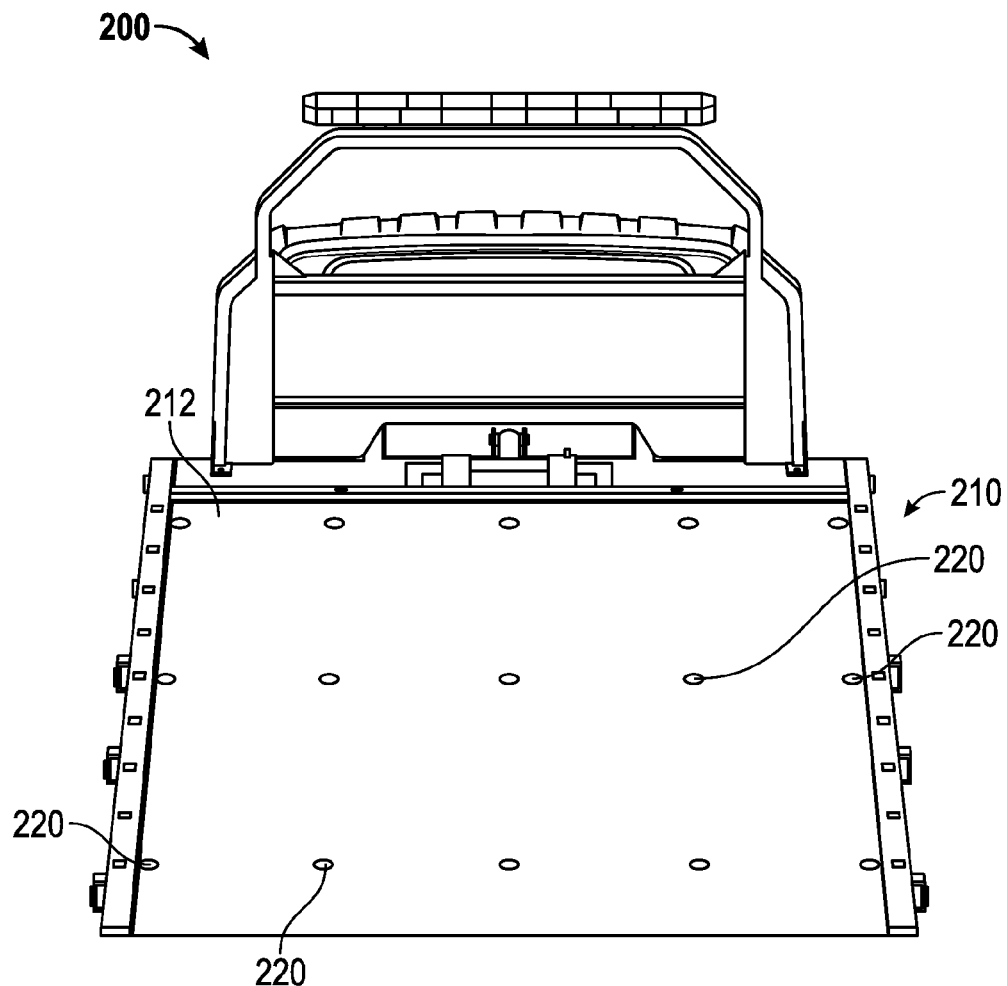

According to the alternative embodiment shown in FIGS. 11-12, a vehicle, shown as carrier truck 200, includes a bed assembly, shown as carrier 210, that includes a platform 212. According to an exemplary embodiment, a plurality of indicator lights, shown as rear-facing lights 220, are arranged in an array and coupled to platform 212. As shown in FIGS. 11-12, rear-facing lights 220 are positioned along a support surface of the platform 212. In some embodiments, carrier truck 200 includes rear-facing lights positioned along the support surface and along the edges of platform 212. According to an exemplary embodiment, a protective lens may be disposed over the rear-facing light 220 to protect them from damage (e.g., due to moisture, due to the weight of vehicles or other cargo, etc.). Such a lens may have a low profile or may be a flat lens (e.g., where rear-facing lights 220 are recessed in openings or sockets formed within platform 212).

As shown in FIG. 11, rear-facing lights 220 are positioned in three columns that form a five by three array. According to the alternative embodiment shown in FIG. 12, the rear-facing lights 220 are positioned in a three by five array. The pattern of rear-facing lights 220 is designed to improve the rearward visibility of carrier truck 200. According to still another alternative embodiment, the rear-facing lights may be otherwise positioned (e.g., in clusters, in a circular array, in a single row or column, along the lateral sides of the support surface, in another pattern, to form a particular shape, etc.).

Figure 13:
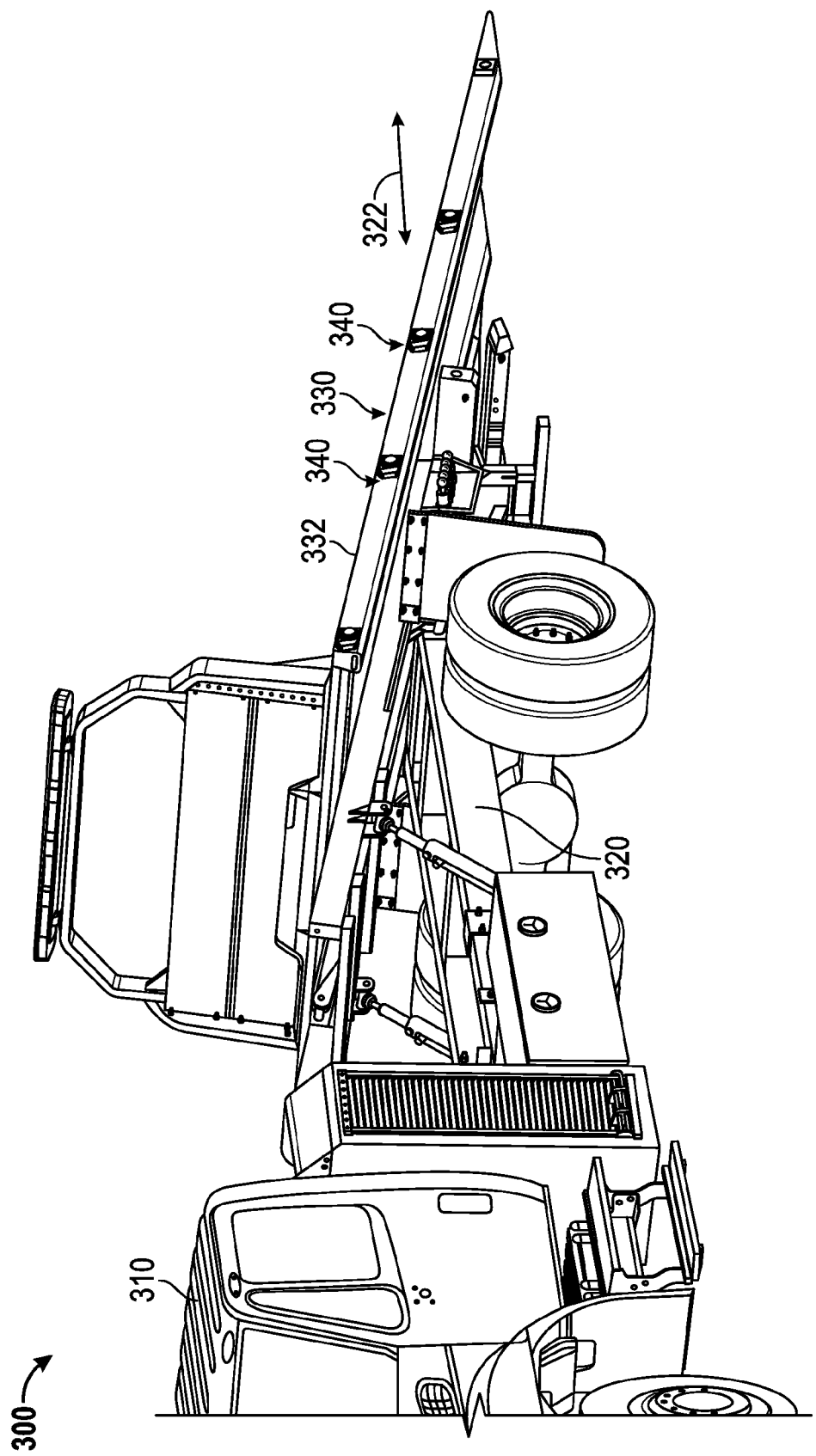
FIGS. 13-14 are partial elevation views of a carrier truck having a plurality of indicator lights that deliver light in a forward direction, according to an exemplary embodiment.
Figure 14:
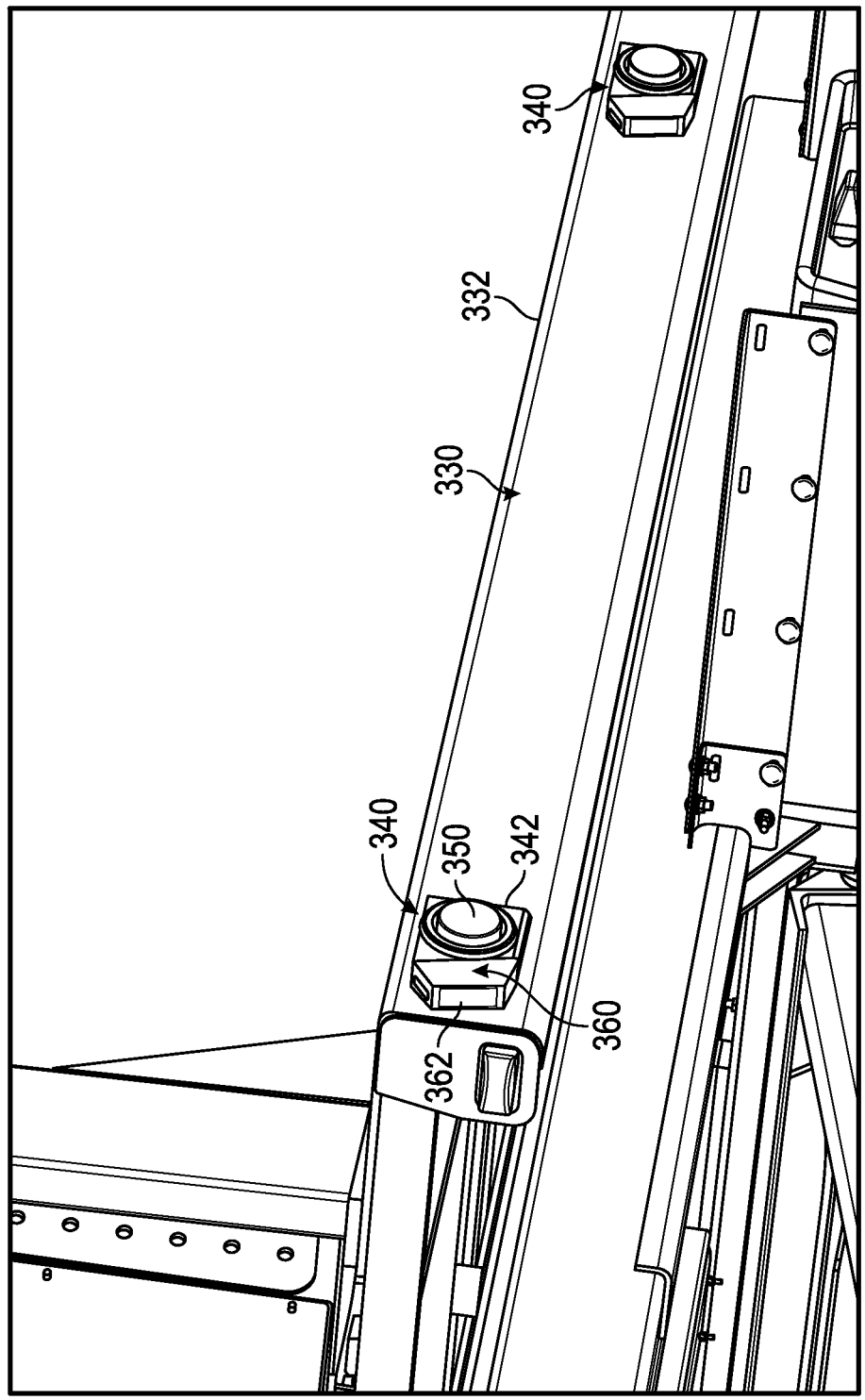

Referring next to the exemplary embodiment shown in FIGS. 13-14, a vehicle, shown as carrier truck 300, includes a cab 310 coupled to a chassis, shown as frame 320. Frame 320 includes a pair of opposing frame members that define a longitudinal direction 322, according to an exemplary embodiment. According to an exemplary embodiment, a forward direction extends in the longitudinal direction 322 toward cab 310 and a rearward direction extends in the longitudinal direction 322 away from cab 310. As shown in FIG. 1, carrier truck 10 includes a bed assembly, shown as carrier 330, that includes a deck (i.e. support surface), shown as platform 332. According to an exemplary embodiment, platform 332 defines a support surface (i.e. a cargo surface) extending between a pair of opposing bed rails.

As shown in FIGS. 13-14, carrier truck 300 includes a plurality of light assemblies, shown as light assemblies 340. The light assemblies 340 include a marker light, shown as sidelight 350, and an indicator light, shown as front-facing light 360, coupled to a housing, shown as body 342. According to an exemplary embodiment, sidelight 350 delivers light laterally across the longitudinal direction 322 to improve lateral visibility and front-facing light 360 delivers light in the forward direction to improve longitudinal visibility (e.g., forward visibility of carrier truck 300). According to an exemplary embodiment, each light assembly 340 also includes an additional indicator light coupled to body 342. Such an additional indicator light may deliver light in the rearward direction to further improve the longitudinal visibility (e.g., rearward visibility) of carrier truck 300. Coupling an additional indicator light to the body 342 reduces the complexity of installing rear-facing lights along carrier 330 by allowing existing lights to be removed and replaced with light assembly 340. According to an exemplary embodiment, side marker lights of existing carriers may be replaced with light assembly 340 thereby improving longitudinal visibility without sacrificing lateral visibility. In other exemplary embodiments, additional indicator lights that direct light in the rearward direction may not be coupled to or integrated with the sidelights 350 but may instead be separate modules coupled to the carrier 330.

According to the exemplary embodiment shown in FIG. 14, front-facing light 360 directs light along a particular direction and includes a primary light axis. The primary light axis is a line along which the intensity of the light from front-facing light 360 is greatest. According to an exemplary embodiment, the light source of the front-facing light 360 is a directional light source (e.g., an LED) such that the primary light is related to the orientation of the light source within front-facing light 360. According to the alternative embodiment shown in FIG. 14, the light source of front-facing light 360 provides light over a wider area and a wave guide (e.g., housing, tubular member, etc.), shown as lens 362, is positioned to direct light from the light source of front-facing light 360 along the primary light axis.

According to an exemplary embodiment, the primary light axis of the front-facing light 360 is offset an angle α from the support surface of platform 332. In other embodiments, the primary light axis of the front-facing light 360 is offset an angle α from another reference (e.g., a ground surface, a horizontal axis, etc.). The angle α is between zero and forty five degrees. In some embodiments the angle α is between zero and thirty degrees. According to an exemplary embodiment, the angle α is fifteen degrees. The angle α may be greater than, equal to, or smaller than angle θ and angle λ. By way of example, light assembly 340 may include an additional indicator light delivering light in the rearward direction and having an offset angle θ that is equal to angle λ and angle α such that light assembly 340 delivers light in both the forward and rearward directions parallel to the ground surface when the platform 332 is in the loading position. According to an exemplary embodiment, the front-facing lights 360 are generally horizontal (e.g., lenses 362 are approximately perpendicular to the ground) when the platform 332 is in the loading position. The front-facing lights 360 thereby emit light in the forward direction and improve longitudinal visibility of the carrier truck 300 when the platform 332 is in the transport position and the loading position.

According to an exemplary embodiment, side marker lights of existing carriers may be replaced with light assembly 340 thereby improving longitudinal visibility (e.g., rearward, forward, or both) without sacrificing lateral visibility. In other exemplary embodiments, additional indicator lights that direct light in the rearward direction may not be coupled to or integrated with the sidelights 350 but may instead be separate modules coupled to the carrier 330. The carrier 330 may include both rear-facing lights and front-facing lights 360.

In still other exemplary embodiments, the light bar, the rear-facing lights, and the forward facing lights are moveably coupled to the carrier of the carrier truck. Moveably coupling the light bar, the rear-facing lights, and the forward facing lights to the carrier of a carrier truck may improve the longitudinal visibility of the carrier truck the platform moves between a transport position and a loading position. The light bar and other lights may be pivotally coupled to the carrier such that they deliver light along a preferred axis (e.g., parallel to a ground surface, parallel to a platform of a carrier, etc.). According to an exemplary embodiment, the light bar and other lights are coupled to an actuator (e.g., a stepper motor, etc.) that pivots (e.g., rotates, repositions, etc.) the light bar and other lights in response to the change in orientation of the carrier (e.g., with sensor input from a device such as an accelerometer, a position sensor, etc.).

According to an alternative embodiment, the light bar and other lights are pivoted automatically by a passive mechanism. By way of example, the light source (e.g., incandescent bulb, LED, halogen bulb, etc.) and the lens may be supported by a rotational bearing. The bearing is provided, for example, between the lens and the housing or between the housing and the carrier. According to an exemplary embodiment, the bearing allows the light source to rotate independent of the carrier. The light source and the lens may be coupled to a ballast or pendulum mass such that it is biased to a particular orientation (e.g., vertical, horizontal, etc.). The light source and the lens may also be coupled to a damper to reduce the rotation of the light bar and other lights due to vibration or forces during driving caused by uneven road surfaces or the acceleration of the carrier truck. It should be understood that any combination of the lights discussed herein may be movably coupled to the carrier with at least one of an active, passive, and semi-active system.

According to an exemplary embodiment, the indicator lights are engaged with a controller. The controller may be a central unit coupled to a plurality of indicator lights or the controller may be coupled to a single indicator light, according to various alternative embodiments. According to an exemplary embodiment, the controller engages the indicator lights according to at least one of a patterned control scheme and a randomized control scheme. The patterned control scheme includes engaging a first subset of a plurality of indicator lights and thereafter engaging a second subset of the plurality of indicator lights. According to an alternative embodiment, the controller engages different indicator lights on a random basis as part of a randomized control scheme. The indicator lights may be sequentially engaged (e.g., where the indicator lights are positioned along an edge of the carrier), engaged in a pattern (e.g., each row or column of an array of indicator lights, etc.), or randomly engaged. According to still another alternative embodiment, the indicator lights are simultaneously illuminated in at least one of an intermittent pattern (e.g., blinking, flashing, etc.) or randomized manner. According to yet another alternative embodiment, the indicator lights are illuminated to form a particular shape (e.g., the indicator lights forming an arrow may flash to direct traffic away from the carrier truck). It should be understood that the controller may engage the indicator lights according to various other patterns.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements. The position of elements may be reversed or otherwise varied, and the nature or number of discrete elements or positions may be altered or varied. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present invention. The order or sequence of any process, logical algorithm, or method steps may be varied or re-sequenced according to alternative embodiments. Other substitutions, modifications, changes, and omissions may be made in the design, operating conditions, and arrangement of the preferred and other exemplary embodiments without departing from scope of the present disclosure or from the spirit of the appended claims.

What is claimed is:
1. A vehicle, comprising:
a chassis including a frame member that defines a longitudinal direction;
a bed assembly including a deck coupled to the frame member and moveable between a transport position and a loading position; and
a light assembly, comprising:
a housing;
a marker light coupled to the housing and positioned to deliver light across the longitudinal direction; and
an indicator light coupled to the housing and positioned to deliver light in the longitudinal direction, wherein the indicator light includes a primary light axis that is angularly offset relative to a support surface of the deck thereby improving longitudinal visibility when the bed assembly is in the loading position,
wherein the light assembly is coupled to the bed assembly to improve lateral and longitudinal visibility of the vehicle when the deck is in the transport position and the loading position.

2. The vehicle of claim 1, wherein the primary light axis is offset from the support surface of the deck at an angle equal to the angle of the deck with respect to a ground surface when the deck is in the loading position.

3. The vehicle of claim 2, wherein the primary light axis is offset between zero and thirty degrees from the support surface of the deck.

4. The vehicle of claim 1, further comprising a cab assembly coupled to the chassis, wherein a forward direction extends in the longitudinal direction toward the cab assembly and a rearward direction extends in the longitudinal direction away from the cab assembly.

5. The vehicle of claim 4, wherein the indicator light is positioned to deliver light along the rearward direction thereby improving rearward visibility of the vehicle.

6. The vehicle of claim 5, wherein the light assembly is coupled to an edge of the bed assembly.

7. The vehicle of claim 5, wherein the light assembly is coupled to the support surface of the bed assembly.

8. The vehicle of claim 7, further comprising a protective lens disposed over the indicator light.

9. The vehicle of claim 1, wherein the housing comprises a plurality of sidewalls including an upper sidewall, wherein the upper sidewall is positioned at least one of (a) parallel to the support surface of the deck with the primary light axis of the indicator light angularly offset therefrom and (b) angularly offset relative to the support surface of the deck.

10. A vehicle, comprising:
    a chassis including a frame member that defines a longitudinal direction;
    a bed assembly including a deck movably coupled to the frame member, wherein the deck includes a support surface configured to support cargo; and
    a light assembly, comprising:
        a housing; and
        an indicator light coupled to the housing and positioned to deliver light in the longitudinal direction, wherein the indicator light includes a primary light axis that is angularly offset relative to the support surface of the deck thereby improving longitudinal visibility when the bed assembly is angled into a loading position,
    wherein the light assembly is coupled along an edge of the bed assembly such that the indicator light is laterally spaced from an outer edge of the support surface to improve longitudinal visibility of the vehicle.

11. The vehicle of claim 10, wherein the light assembly further comprises a marker light coupled to the housing and positioned to deliver light across the longitudinal direction to improve lateral visibility of the vehicle.

12. The vehicle of claim 10, wherein the primary light axis is offset from the support surface of the deck at an angle equal to the angle of the deck with respect to a ground surface when the deck is in a loading position.

13. The vehicle of claim 12, wherein the primary light axis is offset between zero and thirty degrees from the support surface of the bed assembly.

14. The vehicle of claim 10, further comprising a cab assembly coupled to the chassis, wherein a forward direction extends in the longitudinal direction toward the cab assembly and a rearward direction extends in the longitudinal direction away from the cab assembly.

15. The vehicle of claim 14, wherein the indicator light is positioned to deliver light along the rearward direction thereby improving rearward visibility of the vehicle.

16. The vehicle of claim 15, further comprising a protective lens disposed over the indicator light.

17. The vehicle of claim 10, wherein the housing comprises a plurality of sidewalls including an upper sidewall, wherein the upper sidewall is positioned at least one of (a) parallel to the support surface of the deck with the primary light axis of the indicator light angularly offset therefrom and (b) angularly offset relative to the support surface of the deck.

18. A method for enhancing visibility of a vehicle, comprising:
    providing a chassis that defines a longitudinal direction;
    coupling a bed assembly to the chassis;
    positioning a marker light along an edge of the bed assembly to deliver light across the longitudinal direction;
    positioning an indicator light along the edge of the bed assembly to deliver light in the longitudinal direction, wherein positioning the indicator light includes angularly offsetting a primary light axis of the indicator light relative to a support surface of the bed assembly thereby improving longitudinal visibility when the bed assembly is selectively reconfigured into a loading position; and
    engaging the indicator light with a controller, wherein the indicator light delivers light in the longitudinal direction to improve longitudinal visibility of the vehicle.

19. The method of claim 18, further comprising engaging the indicator light according to at least one of a patterned control scheme and a randomized control scheme.

20. The method of claim 18, further comprising positioning an array of indicator lights along the edge of the bed assembly, wherein the controller engages the array of indicator lights according to at least one of a patterned control scheme and a randomized control scheme.

* * * * *